United States Patent [19]

Brown

[11] Patent Number: 4,736,600
[45] Date of Patent: Apr. 12, 1988

[54] MODULAR SELF-DISPENSING FROZEN CONFECTIONARY MAKER

[75] Inventor: Lester Brown, 142-18 Booth Memorial Ave., Flushing, N.Y. 11355

[73] Assignees: Lester Brown, Flushing, N.Y.; George Gropper, Teaneck, N.J.; Mario J. Aguilar, Miami, Fla.

[21] Appl. No.: 34,433

[22] Filed: Apr. 3, 1987

[51] Int. Cl.$^4$ .............................................. A23G 9/12
[52] U.S. Cl. ................................. 62/342; 222/146.6; 222/164; 222/167; 366/185; 366/186; 366/195
[58] Field of Search .............. 62/342, 343; 222/146.6, 222/164, 166, 167, 184, 412, 413; 366/50, 144, 185, 186, 194–196

[56] References Cited

U.S. PATENT DOCUMENTS

| | | | |
|---|---|---|---|
| 293,437 | 2/1884 | Ellis | 222/164 |
| 1,200,611 | 10/1916 | Heller | |
| 2,850,052 | 9/1958 | Solie | 222/164 X |
| 3,147,891 | 9/1964 | Fielitz | 222/166 |
| 3,570,569 | 3/1971 | Hartley et al. | 366/196 X |
| 3,813,082 | 5/1974 | Manser | 259/6 |
| 3,818,716 | 6/1974 | Carpigiani | 62/178 |
| 3,888,424 | 6/1975 | Chapman | 222/164 X |
| 3,914,956 | 10/1975 | Knight, Jr. | 62/343 |
| 3,958,968 | 5/1976 | Hosaka | 62/343 |
| 4,205,535 | 6/1980 | Maurer | 62/342 |
| 4,391,575 | 7/1983 | Osrow | 366/196 X |
| 4,488,817 | 12/1984 | Uesaka et al. | 366/149 |
| 4,606,200 | 8/1986 | Nielsen | 62/302 |
| 4,669,275 | 6/1987 | Ohgushi et al. | 62/342 |

OTHER PUBLICATIONS

Nikkal Industries Ltd., Cedar Grove, N.J., Brochure re Donvier brand Ice Cream Maker.
Osrow Products Corporation, Old Beth Page, N.Y., Brochure re Osrow Pasta and Dough Machine.
C.A.D. Srl. TV, Italy, Brochure re Ice Cream Machine.
Glacier, Hartford, Conn., Brochures re Slush Mug and Slush Barrel Brand Frozen Desert Makers.
Nemo Srl., Brescia, Italy, Brochures entitled: "Top Ice Cream Maker" and Pop Ice.
Philips Home Products, Inc., Akron, Ohio, Brochure entitled: "Ice Cream Maker HR 2295".

Primary Examiner—William E. Tapoicai
Attorney, Agent, or Firm—Glenn F. Ostrager

[57] ABSTRACT

A modular self-dispensing ice cream maker includes an open-ended chilling container which encloses a mixing chamber in which a dasher is mounted for bidirectional rotation. The container includes a cylindrical chamber which is at least partially filled with freezable solution for cooling ice cream ingredients. The open end of the mixing chamber receives a cover having a dispensing outlet. The ice cream maker is adapted for orientation in mixing and dispensing modes in which the container is respectively supported in generally vertical and horizontal orientations. The dasher includes blades configured to scrape an inner container wall during rotation in a first direction for mixing ice cream. Reverse rotation of the dasher advances ice cream toward the cover for dispensing.

16 Claims, 7 Drawing Sheets

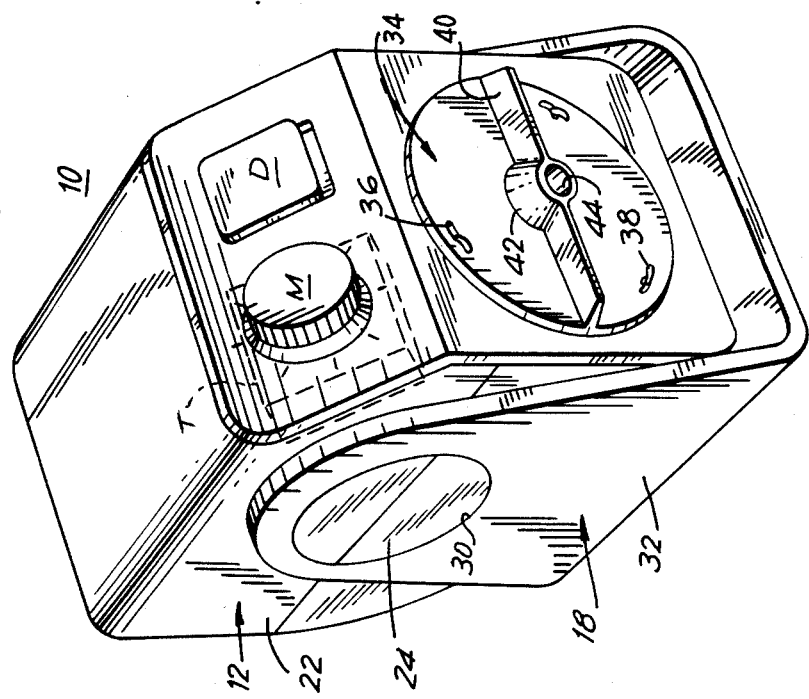
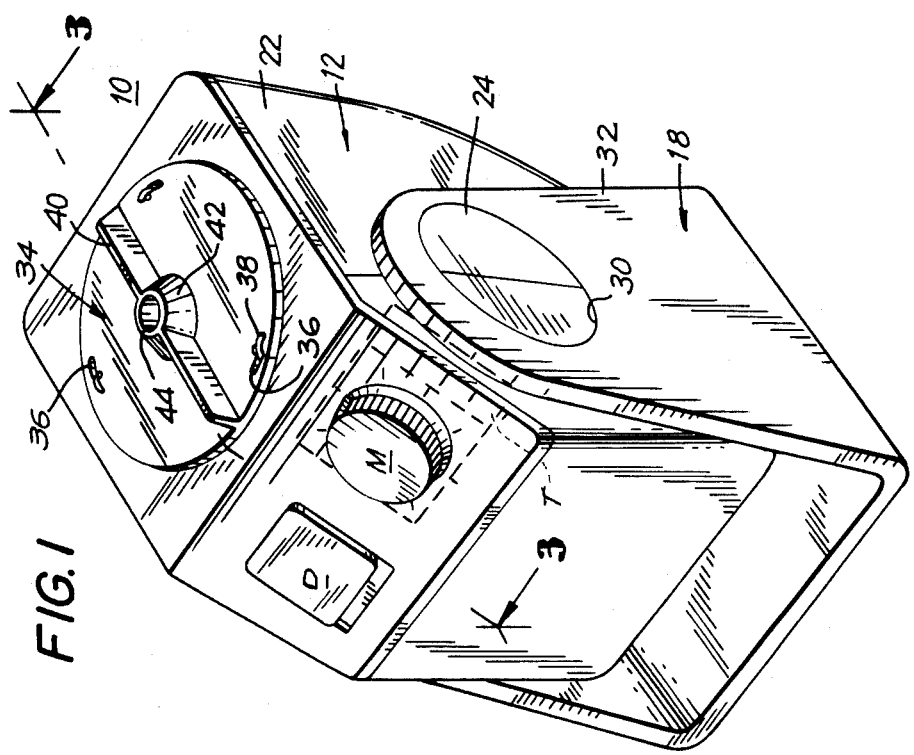

MODULAR SELF-DISPENSING FROZEN CONFECTIONARY MAKER

1. Technical Field

The present invention relates to an apparatus for making and dispensing frozen confections, such as ice cream and sherbert. More particularly, the invention is concerned with a self-dispensing ice cream apparatus of modular design which may be readily assembled and disassembled for advantage in manufacture and maintenance.

Both manual and electronic operated ice cream makers are known in the art. Ice cream makers generally comprise a freezing cylinder which receives a liquid ice cream mix and a rotable dasher element which mixes and scraps thickened or frozen mix from inner walls of the cylinder to form ice cream.

In manually operated ice cream makers dasher elements are mounted in a cover which seals a freezing cylinder. The dasher is driven by hand and ice cream is accessed in the cylinder by removal of the cover, see U.S. Pat. No. 4,488,817.

Automatic dispensing ice cream apparatus employ pumping devices which introduce complex structure with associated manufacturing costs. For example, U.S. Pat. No. 3,818,716 employs a replaceable pressure gas cartridge to introduce pressurized gas into an ice cream freezing chamber. The pressurized chamber coacts with a valve structure to dispense soft ice cream.

In another approach of the prior art a freezing receptacle is provided with an outlet channel in a lower end for dispensing soft ice cream. A dasher element is configured to provide an auger action within the receptacle for dispensing of the ice cream. See U.S. Pat. Nos. 3,958,968 and 3,914,956. Such apparatus have not proved entirely satisfactory in that they require use of complicated valve structures in the freezing receptacle.

Accordingly, it is a broad object of the present invention to provide an improved apparatus for automatically dispensing soft frozen confectionary mixtures which is of compact design.

An object of the invention is to provide a modular apparatus for automatically dispensing confectionary mixtures which is of less complex design than prior art apparatus for efficiencies in manufacture and maintenance.

A further object of the invention is to provide a modular self-dispensing confectionary mixing apparatus which is movable from a first vertically supported position for mixing to a second horizontal orientation for dispensing of mixture.

A still further oject of the invention is to provide a modular self-dispensing mixing apparatus which employs a bidirectional dasher for mixing and dispensing functions.

DISCLOSURE OF THE INVENTION

In the present invention, these purposes, as well as others which will be apparent, are achieved generally by providing an ice cream maker including an open-ended chilling container for receiving ice cream ingredients, a coupling element rotatably mounted in the container, a dasher arranged in the container and coupled to the rotatable coupling element, and a bidirectional drive means for rotating the coupling element and dasher. A cover which includes an ice cream dispensing outlet closes the open end of the container for mixing and dispensing functions. Means are provided for supporting the foregoing elements in a first mixing mode in which the axis of rotation of the dasher is substantially vertical, and a second dispensing mode in which the dasher is oriented substantially horizontal.

The bidirectional dasher includes scraper blades and edges which are configured to effect movement of ice cream mixture in the first mixing mode inwardly within the container, and outwardly in the second mode for dispensing of ice cream.

In a first preferred embodiment the supporting means comprises a housing for the container and associated elements which is pivotably mounted on a base. The housing pivots between first and second vertical and horizontal positions which respectively correspond to the first and second mixing and dispensing modes of the ice cream maker.

In a second preferred embodiment the supporting means comprises first and second support surfaces formed on a housing for the ice cream maker. The first and second support surfaces respectively position the ice cream maker and the axis of the dasher in vertical and horizontal orientations corresponding to mixing and dispensing modes.

Further objects, features and advantages of the invention will become apparent upon consideration of the following detailed description of preferred but nonetheless illustrative embodiments, when considered in conjunction with the following drawings, in which:

BRIEF DESCRIPTION OF THE DRAWINGS

FIG. 1 is a perspective view of a first preferred embodiment of the invention in which the housing is pivotably supported in a first mixing position;

FIG. 2 is a perspective view of the preferred embodiment of FIG. 1 with the housing pivotably supported in a second dispensing position;

DETAILED DESCRIPTION OF THE PREFERRED EMBODIMENTS

Figure 3:
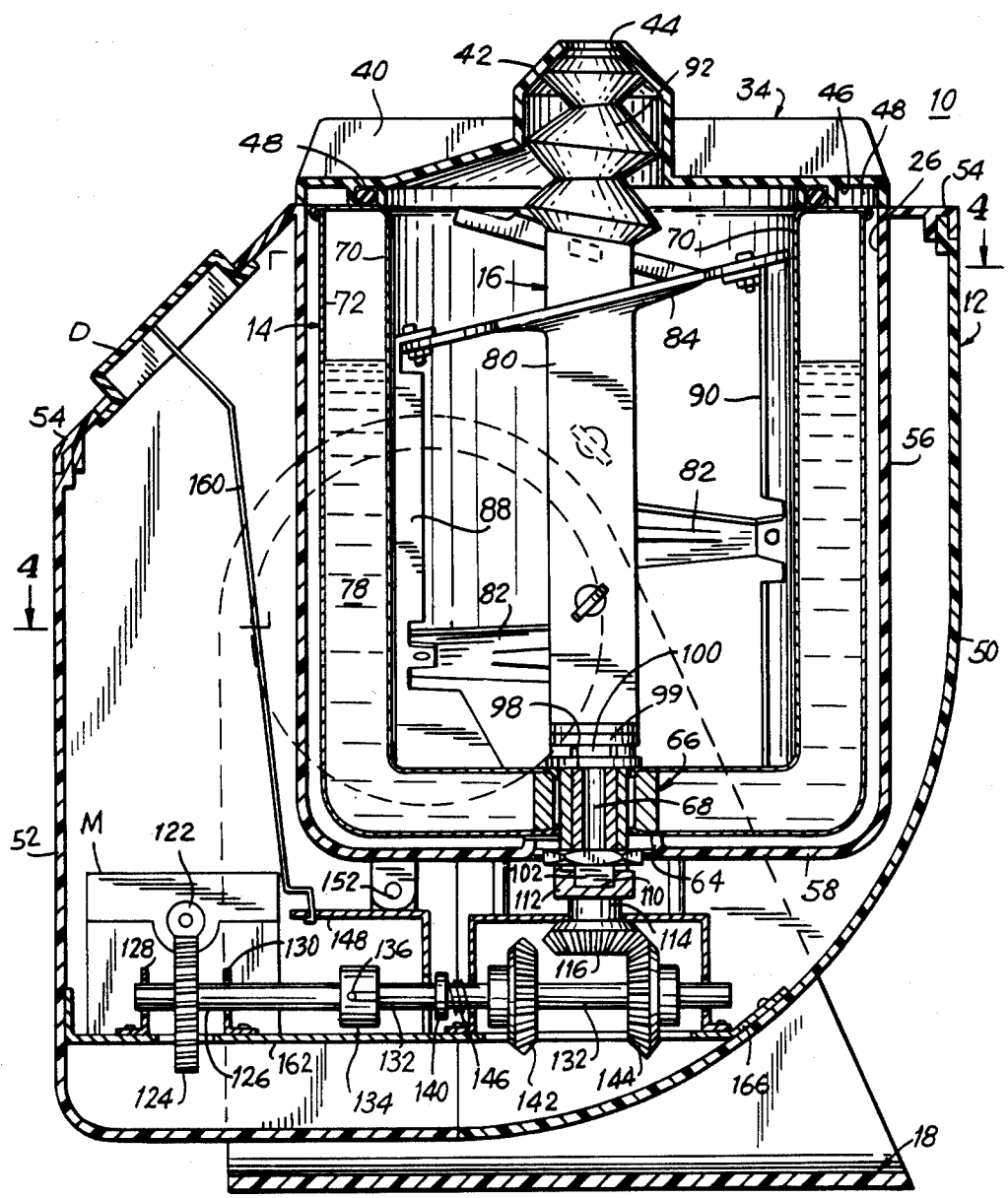
FIG. 3 is a sectional view taken substantially along the line 3—3 of FIG. 1.

Referring now to the drawings and, more particularly, to FIGS. 1-5, and 9 there is illustrated a modular apparatus for dispensing frozen confectionary products generally designated 10. Although the apparatus has general application in dispensing frozen confectionary products, it is believed to have particular application for home use as a soft ice cream maker and dispenser.

FIGS. 1 and 2 show a modular self-dispensing ice cream maker 10 in accordance with a first preferred embodiment. The modular ice cream maker 10 comprises a housing 12 which supports an open ended chilling container 14, a dasher 16, drive means including a motor M, and other elements which will be more fully described hereinafter. The housing 12 is pivotably supported within a base 18 having a U-shaped profile. Both the housing and the base are preferably fabricated of injection molded ABS plastic. The pivotal support arrangement of this invention permits ready positioning of the housing in mixing and dispensing modes respectively illustrated in FIGS. 1 and 2.

Figure 4:
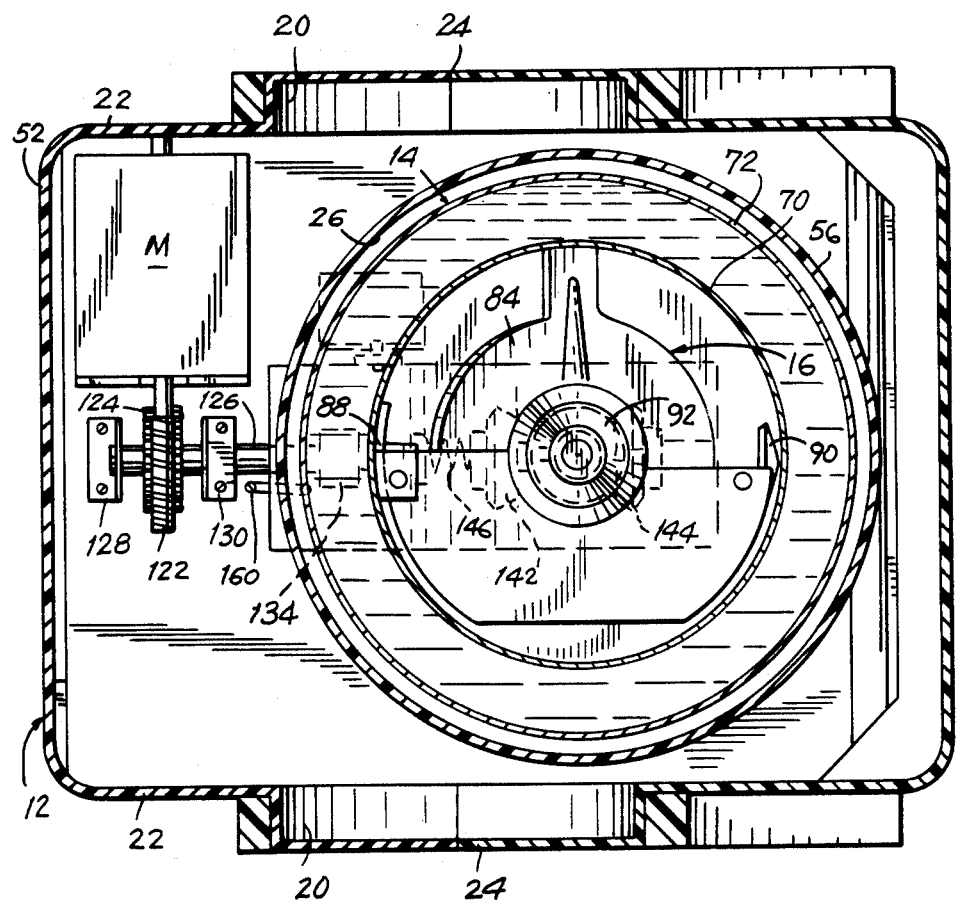
FIG. 4 is a sectional view taken substantially along the line 4—4 of FIG. 3.

The housing 12 includes hubs 20 on opposing side walls 22 which receive force-fit swivel caps 24, see FIG. 4. Swivel caps 24 are rotatably arranged in corresponding substantially cylindrical bores 30 formed in vertical members 32 of the U-shaped base 18. It will be appreciated that the swivel caps could alternatively be incorporated in the vertical base members and means could be provided on the housing for receiving the swivel caps.

A cover 34 which may also be fabricated of a polycarbonate is received in a housing opening 26. Secure engagement of the cover 34 in the opening can be obtained in any known conventional manner. In the preferred embodiment the cover is provided with holes 36 which engage cover locks 38, see FIGS. 1 and 2.

The cover 34 also includes a handle 40 and a nozzle 42 which are integrally formed therein. The nozzle 42 is provided with an outlet 44 for dispensing ice cream when the housing 12 is in the position shown in FIG. 2. A peripheral channel 46 is provided for receiving a gasket 48 to seal the cover and prevent leakage during operation of the ice cream apparatus.

As best illustrated in the sectional view of FIG. 3, the housing 12 of the first preferred embodiment comprises molded plastic lower and upper body sections 50, 52, and a molded plastic top 54 which receives the cover 34 in opening 26. The housing 12 also includes a substantially cylindrical portion 56 having a base portion 58, and a top open end which defines with the housing opening 26.

The open-ended chilling container 14, which is fabricated of a conductive material such as aluminum, is received inside the cylindrical housing portion 56. Container 14 comprises, inner and outer cylindrical walls 70, 72 which enclose a cylindrical chamber 78, and a base 74 which has a centrally formed bore 76. A coupling assembly 66 is received within the bore 76 to seal the base 74 of the container. The assembly 66 includes a coupling element 68, a bearing 96 positioned between the coupling element 68 and the container bore 76, and a cylindrical washer 98 which surrounds the bearing 96.

The coupling assembly 66 may be secured locked in the container base by conventional means, such as a nut and bolt, to prevent leakage of the container contents through the base. The coupling element 68 extends through an opening 64 in the housing base 58. The cylindrical chamber 78 is partially filled with a solution suitable for freezing at a low temperature, for example, a solution of water and non-toxic salts.

Figure 9:
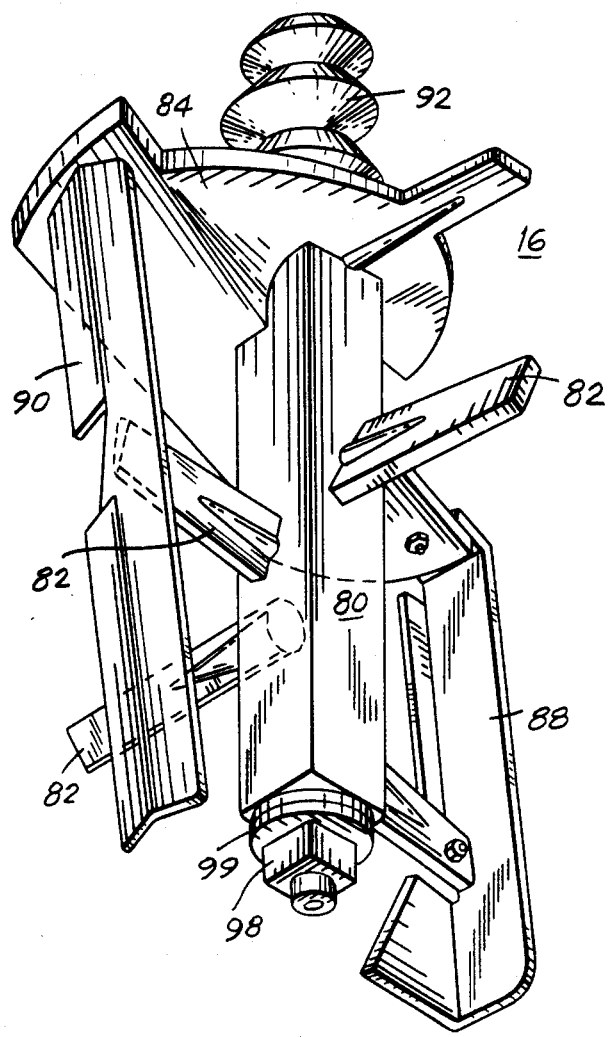
FIG. 9 is a perspective view of a dasher employed in the invention.

The dasher 16, best illustrated in FIGS. 3 and 9, which is preferably fabricated of nylon, polycarbonate, or polypropoylene, includes a central shaft 80, mixing blades 82, a cross member 84, arcuate scraping blades 88, 90, and auger screw 92. Mixing blades 82 extend radially outward from the shaft 80 at an incline relative to a radial plane. Cross member 84 which has a semicircular configuration extends radially from the shaft to the inner wall 70 of the chilling container 14 angularly offset from a horizontal plane, see FIG. 3. Scraping blades 88, 90 depend from the cross member 84 and are connected to the mixing blades 82 for structural support. Scraping blades 88, 90 each have arcuate edges which scrape ice cream from the inner wall 70 of the container 14 during rotation of the dasher in a counterclockwise direction. When the dasher is rotated in a clockwise direction the curved edges of the scraping blades move ice cream toward the open end of the container for dispensing.

In operation, the dasher 16 is positioned in the chilling container 14 through housing opening 26 and positioned in engagement with the coupling element 68. A drive force is transmitted to the dasher by the coupling element 68 which extends through container base 74 and meshes with dasher shaft 80.

The coupling element 68 includes a recess 100 at one end having a non-circular profile (for example, square) for interlocking with a projection 98 of the same profile formed in the base 99 of shaft 80, and a projection 102 at the other end also having a non-circular profile for interlocking with a recess 110 of the same profile formed in the base 112 of a driven shaft 114. Driven shaft 114 has a driven miter gear 116 which is coaxially connected to the base 112. Drive shaft 114 is pivotably mounted on U-shaped bracket 115 by a conventional bearing means (not shown). Thus, any torque applied to driven shaft 114 is transmitted to dasher 16 by means of coupling element 68.

The motor imparts bidirectional rotation to the miter gear 116 through a gear arrangement. The gear arrangement and motor are best shown in the perspective view of FIG. 5, which depicts the motor chassis assembly. The motor M drives an output shaft 120 which includes a grooved end 122. A worm gear 124, which is coaxially mounted on a shaft 126, is coupled to the grooved shaft end 122. Shaft 126 is pivotably supported at two points by brackets 128, 130. Thus, the torque produced by the motor is transmitted to shaft 126 by way of worm 122 and worm gear 124.

The torque applied to shaft 126 is transmitted to an axially displaceable shaft 132 by means of a torque transmission coupling comprising sleeve 134, which is connected to an end of shaft 126, and a pin 136 which extends radially from the end of shaft 132. Sleeve 134 has an axial slot 138 in which pin 136 travels during axial displacement of shaft 132. The width of slot 138 is substantially equal to the diameter of pin 136 to transmit rotation of shaft 126 to shaft 132.

Axial displacement of shaft 132 permits shifting of the driving gears. Coaxially mounted on the driving shaft 132 are a disk 140, a first driving miter gear 142, and a second driving miter gear 144. The driving shaft 132 is pivotably supported at two points by the side walls of U-shaped bracket 115. A spring 146 is arranged around shaft 132 and between disk 140 and the nearest side wall of U-shaped bracket 115.

Shaft 132 is displaced axially by rotating a bell crank 148, which is rigidly connected to a tab 150 which in turn is pivotably mounted on bracket 154 by means of pivot pin 152. The bell crank 148 which has an L-shaped profile, essentially comprises a pair of plates 147, 149 integrally connected at right angles. Plate 149 has a recess 158 for receiving shaft 132 and is arranged to contact disk 140 when bell crank 148 is rotated in a counterclockwise direction (as viewed in FIG. 5) about pin 152. During this counterclockwise rotation of bell crank 148 the plate with recess 158 thrusts disk 140 to the right, whereby shaft 132 is axially shifted.

Figure 5:
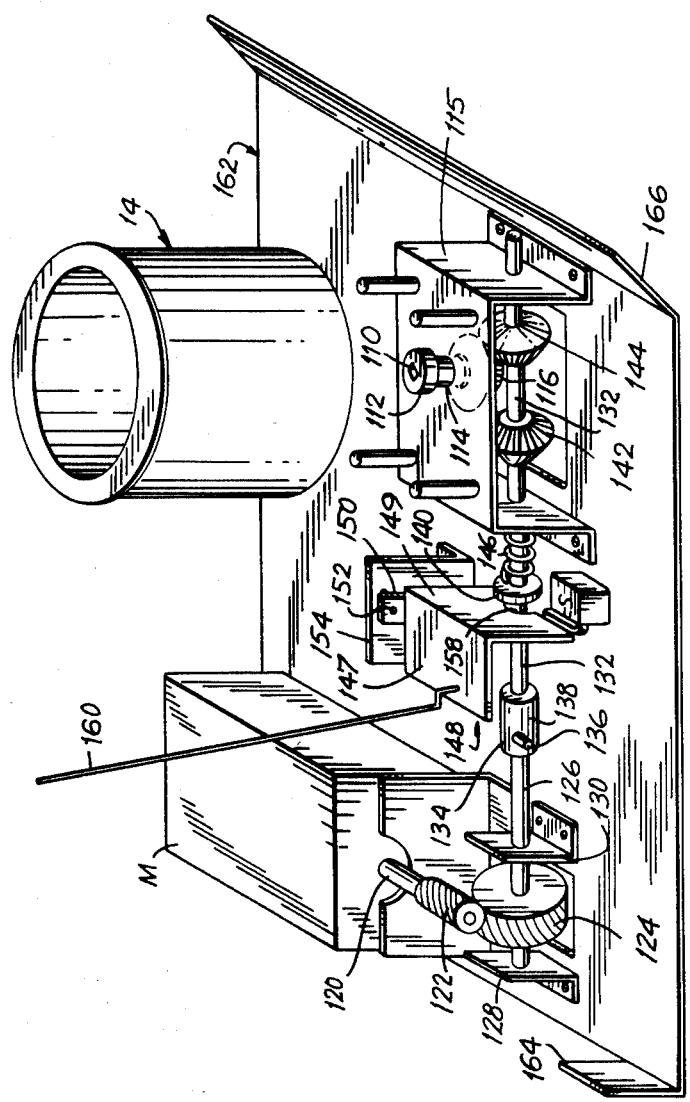
FIG. 5 is a perspective view of a motor chassis assembly incorporated in the first preferred embodiment.

Brackets 128, 130 and 154 and U-shaped bracket 115 are all secured on chassis 162, as shown in FIG. 5. Chassis 162 is in turn secured to housing 12 by means of a pair of tabs 164 (only one of which is shown in FIG. 5) and an angled portion 166. Axial displacement of shaft 126 takes place between two extreme positions: a first position in which driving miter gear 142 meshes with driven miter gear 116, and a second position in which driving miter gear 144 meshes with driven miter gear 116. Advantageously, the gear arrangement of the invention imparts bidirectional motion to the dasher without requirement of a reversible motor. When driving miter gear 142 meshes with driven miter gear 116 during motor operation, driven miter gear 116 is driven in one direction; if driving miter gear 144 is meshed with driven miter gear 116 during motor operation, driven miter gear 116 is driven in the opposite direction.

The motor M is actuated by a microswitch S which is controlled by a mixing and timer knob M, and dispensing slide button D, which respectively engage the ice cream maker 10 in mixing and dispensing modes of operation. Dispensing button D is connected by conventional latching means (not shown) to push rod 160. Rotation of the bell crank is produced by means of a push rod 160 which is connected to plate 147, see FIGS. 3 and 5.

Mixing and dispensing controls M, D are mounted in the housing to activate mixing and dispensing modes of operation of the ice cream maker. When the housing is in the position shown in FIG. 1, mixing knob M activates the mixing mode of the ice cream maker. The mixing knob M also control a conventional timer mechanism T which is connected in parallel to the microswitch to engage the dasher 16 in a clockwise mixing mode rotation. Advantageously, the timer mechanism may be set to automatically mix ice cream for a prescribed period.

To dispense ice cream, the user rotates the housing 12 by approximately 90 degrees to the position shown in FIG. 2, and slides the dispensing button D to activate the dispensing mode of the apparatus. In the dispensing mode of FIG. 2, upward movement of button D moves push rod 160 down thrusting bell crank 148 against disk 140 to actuate the microswitch S and motor, engaging the dasher 16 in counterclockwise rotation for dispensing of ice cream. In the preferred embodiment the microswitch is activated by movement of the bell crank 148. Button D is spring loaded so that its release pulls push rod 160 up releasing disk 140 which is then urged to the left by spring 146.

Figure 6:
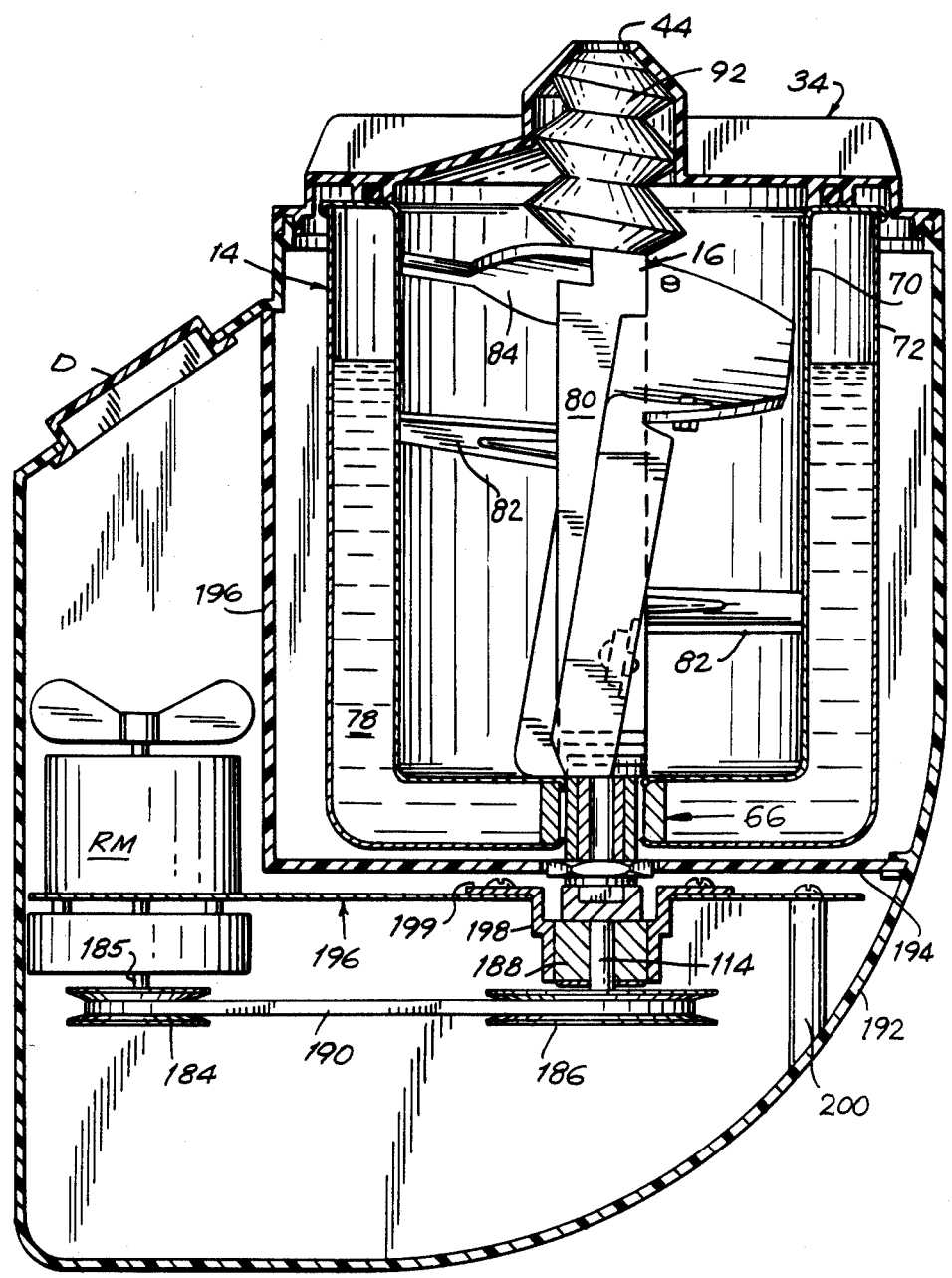
FIG. 6 is a sectional view of a second preferred embodiment which includes a driving mechanism different from the mechanism of used in the first embodiment.

A second preferred embodiment, depicted in FIG. 6, employs an alternative motor chassis assembly. In this embodiment, the driven shaft 114 includes pulley 186 which is coaxially mounted on an end opposite the coupling element 66. A second pulley 184 is coaxially mounted on an output shaft of a reversible motor RM. A belt 190 is looped with tension in raceways of pulleys 184, 186 to transmit rotation of output shaft 185 to driven shaft 114, the rotation of the latter being in turn transmitted to dasher 16 by way of coupling element 66.

Reversible motor RM is mounted on a chassis 196 which is supported by support rod 200 which in turn is connected to outer body 192. Chilling container 14 is received in a chamber formed by a partition 194 and a portion of outer body 192. Chassis 196 has an opening in which a sleeve 198 is coupled by a flange 199. Driver shaft 114 is rotatably supported by bearing means 188 housed in a sleeve 198.

Figure 8:
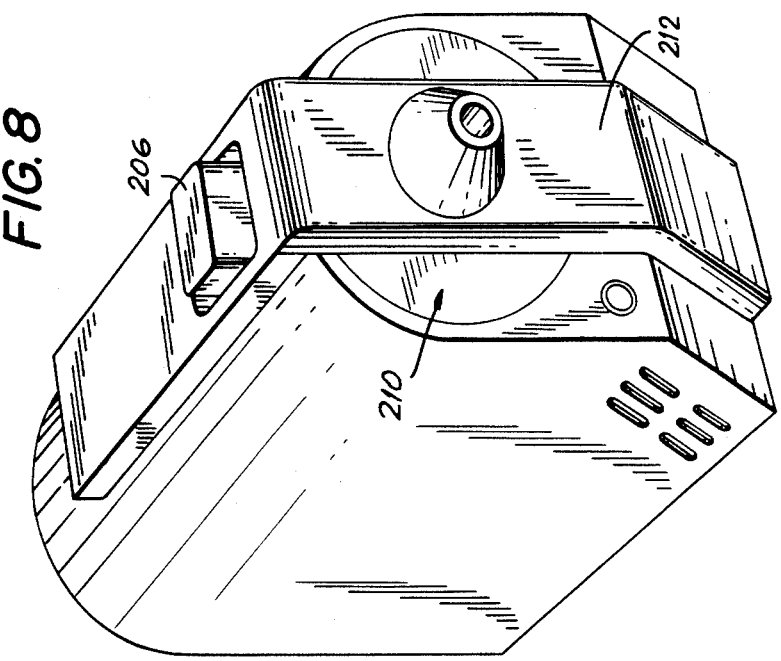
FIG. 8 is a perspective view of the preferred embodiment of FIG. 7 showing the housing supported on a second flat surface in a dispensing position.
Figure 7:
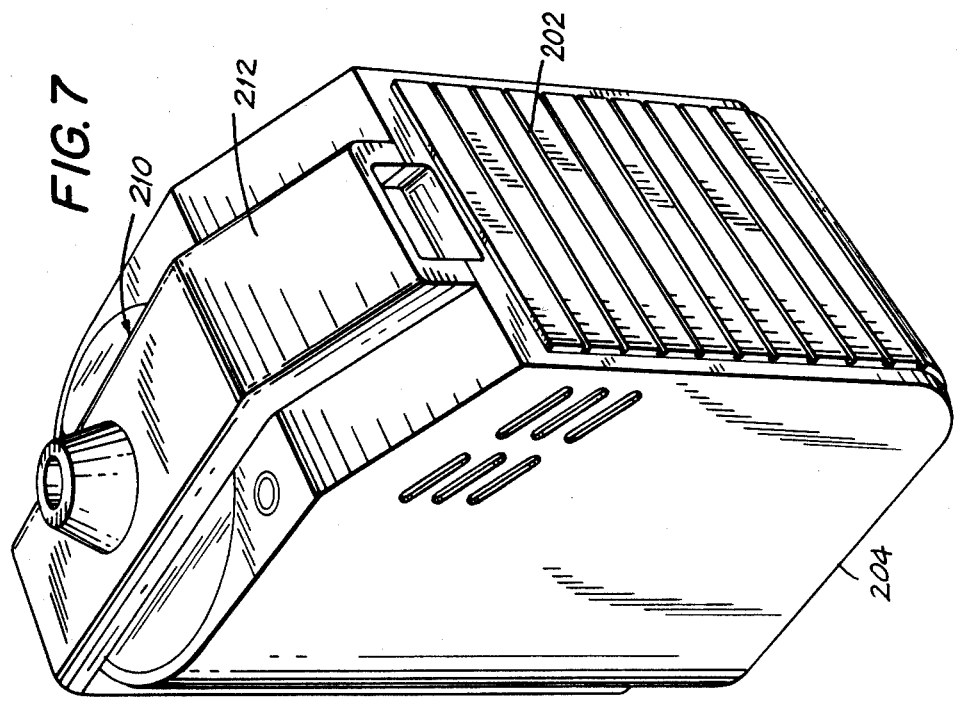
FIG. 7 is a perspective view of a third preferred embodiment of the invention showing the manner in which a housing is supported on a flat surface in a first mixing position.

A third preferred embodiment is depicted in FIGS. 7 and 8. The housing of the third preferred embodiment is provided with first and second planar support surfaces 202, 204. Planar support surface 204 is disposed relative to the axis of rotation of the dasher so that the housing is seated on support surface 204 when the axis of rotation of the dasher 16 is substantially vertical. When the housing is seated on planar support surface 202 (see FIG. 8), the axis of rotation of the dasher is positioned in a substantially horizontal orientation. Surfaces 202 and 204 are preferably textured to prevent sliding on surfaces such as kitchen counters or tables.

The third preferred embodiment has a three-position switch 206, namely, FORWARD-OFF-REVERSE. When switch 206 is in the FORWARD position, the reversible motor drives the dasher in the mixing direction. When switch 206 is in the REVERSE direction, the motor drives the dasher in the opposite, i.e. dispensing direction.

The cover 210 of the third preferred embodiment has a handle 212 which locks the cover in place to prevent rotation of the cover during mixing or dispensing.

Ice cream is made in accordance with the following procedure: First, the chilling container 14 is placed in the freezer compartment of a refrigerator until the liquid between the walls is frozen. The container is then placed inside the housing, which is positioned in a first vertical orientation for receiving and mixing ice cream ingredients. The coupling element 66 which is mounted in the base 74 of the container is positioned in engaging relation with the driven shaft 114. Dasher 16 is similarly positioned inside the container with its shaft 80 in engagement with coupling 66. The cover is then locked over the open end of the container and the motor is engaged and the dasher rotated in a counterclockwise mixing direction until the contents are frozen to the consistency of soft ice cream.

For dispensing of ice cream, the housing is rotated by approximately 90 degrees so that the axis of the dasher shaft 80 is substantially horizontal. Rotation of the dasher in a clockwise direction causes the arcuate scraping blades 88, 90 to push the ice cream toward the cover 34. Auger screw 92 pushes the ice cream through nozzle 42 and a dispensing outlet 44. The outlet can be provided with an extrusion die which forms a stream of dispensed ice cream into a decorative shape.

The foregoing description of the preferred embodiments is presented for illustrative purposes only and is not intended to limit the scope of the invention as defined in the appended claims. Modifications may be readily effected by one having ordinary skill in the art without departing from the spirit and scope of the invention concept herein disclosed.

We claim:

1. A self-dispensing frozen confectionary maker comprising:
    (a) a container defining a mixing chamber with an open end, said container having a hollow chamber at least partially filled with a freezable solution;
    (b) a coupling means rotatably mounted in said container;
    (c) means for driving said coupling means to rotate in either of first and second directions, said second direction being opposite to said first direction;
    (d) means for displacing a fluid in said mixing chamber, said fluid-displacing means being arranged in said mixing chamber and rotatably coupled to said coupling means;

(e) cover means for securely covering said open end, said cover means having outlet means incorporated therein; and (f) means for supporting said container in first and second positions, wherein said fluid-displacing means has an axis of rotation which is generally vertical when said container is in said first position and generally horizontal when said container is in said second position.

2. The self-dispensing frozen confectionary maker as defined in claim 1, further comprising a housing enclosing said driving means, said container being arranged in a recess formed by said housing, and said support means comprising a base pivotably coupled to said housing, said container being moved between said first and second positions by pivoting of said housing relative to said base.

3. The self-dispensing frozen confectionary maker as defined in claim 1, wherein said fluid-displacing means comprises means for scraping said mixing chamber when said fluid-displacing means is rotated in said first direction and means for pushing fluid in said mixing chamber toward said cover.

4. The self-dispensing frozen confectionary maker as defined in claim 3, wherein said fluid-displacing means further comprises screw means for pushing fluid through said outlet means in said cover means when said fluid-displacing means is rotated in said second direction.

5. The self-dispensing frozen confectionary maker as defined in claim 4, wherein said fluid-displacing means further comprises means for mixing fluid in said mixing chamber.

6. The self-dispensing frozen confectionary maker as defined, in claim 1, wherein said container has a cylindrical shape, an inner wall, and an open top end.

7. The self-dispensing frozen confectionary maker as defined, in claim 1, wherein said fluid-displacing means comprises a shaft having a first end rotatably coupled to said coupling means, a mixing blade extending radially outward from said shaft, a cross member having a semi-circular configuration extending radially from said shaft to the inner container wall, first and second means for scraping the inner wall of said mixing chamber which include arcuate scraping blades, said blades depending from said cross member.

8. The self-dispensing ice cream maker as defined, in claim 3, wherein said fluid-displacing means further comprises screw means coaxially mounted on a second end of said shaft.

9. A self-dispensing frozen confectionary maker comprising:

(a) a container defining a mixing chamber with an open end, said container having a hollow chamber at least partially filled with a freezable solution;

(b) a coupling means rotatably mounted in said container;

(c) means for driving said coupling means to rotate in either of first and second directions, said second direction being opposite to said first direction;

(d) means for displacing a fluid in said mixing chamber, said fluid-displacing means being arranged in said mixing chamber and rotatably coupled to said coupling means;

(e) cover means for securely covering said open end, said cover means having outlet means incorporated therein; and (f) means for supporting said container in first and second positions, wherein said fluid-displacing means has an axis of rotation which is generally vertical when said container is in said first position and generally horizontal when said container is in said second position, said support means including a first plurality of support points in a first plane and a second plurality of support points in a second plane, said first and second pluralities of support points being located on a housing which encloses said driving means, said container being arranged in a recess formed by said housing, said container being in said first position when said housing is seated on said first plurality of support points and being in said second position when said housing is seated on said second plurality of support points.

10. A self-dispensing frozen confectionary maker comprising:

(a) a container defining a mixing chamber with an open end, said container having a hollow chamber at least partially filled with a freezable solution;

(b) a coupling means rotatably mounted in said container;

(c) means for driving said coupling means to rotate in either of first and second directions, said second direction being opposite to said first direction, said drive means including a reversible motor operatively coupled to said coupling means by pulley means;

(d) means for displacing a fluid in said mixing chamber, said fluid-displacing means being arranged in said mixing chamber and rotatably coupled to said coupling means;

(e) cover means for securely covering said open end, said cover means having outlet means incorporated therein; and (f) means for supporting said container in first and second positions, wherein said fluid-displacing means has an axis of rotation which is generally vertical when said container is in said first position and generally horizontal when said container is in said second position.

11. The self-dispensing frozen confectionary maker as defined in claim 10, further comprising control means for switchably controlling said reversible motor.

12. A self-dispensing confectionary maker comprising:

(a) a container defining a mixing chamber with an open end, said container having a hollow chamber at least partially filled with a freezable solution;

(b) a coupling means rotatably mounted in said container;

(c) means for driving said coupling means to rotate in either of first and second directions, said second direction being opposite to said first direction, said drive means including a motor operatively coupled to said coupling means by gear means;

(d) means for displacing a fluid in said mixing chamber, said fluid-displacing means being arranged in said mixing chamber and rotatably coupled to said coupling means;

(e) cover means for securely covering said open end, said cover means having outlet means incorporated therein; and (f) means for supporting said container in first and second positions, wherein said fluid-displacing means has an axis of rotation which is generally vertical when said container is in said first position and generally horizontal when said container is in said second position.

13. The self-dispensing frozen confectionary maker as defined in claim 12, wherein said gears means comprises a driven gear rotatably coupled to said coupling means, and first and second driving gears securely mounted on an axially displaceable shaft.

14. The self-dispensing frozen confectionary maker as defined in claim 13, further comprising control means for displacing said shaft between first and second axial positions, said first driving gear meshing with said driven gear when said shaft is located at said first axial position and said first axial position and said second driving gear meshing with said driven gear when said shaft is located at said second axial position.

15. The self-dispensing frozen confectionary maker as defined in claim 14, wherein said control means comprises a slide button mounted on said housing.

16. A self-dispensing frozen confectionary maker comprising:
(a) a container defining a mixing chamber with an open end, said container having a hollow chamber at least partially filled with a freezable solution;
(b) means for displacing a fluid in said mixing chamber, said fluid-displacing means being arranged in said mixing chamber;
(c) a coupling means for mounting said fluid-displacing means in said container;
(d) drive means for imparting relative rotational motion between said fluid-displacing means and said mixing chamber;
(e) cover means for securely covering said open end, said cover means having outlet means incorporated therein; and
(f) means for supporting said container in first and second positions, wherein said fluid-displacing means has an axis of relative rotation which is generally vertical when said container is in said first position and generally horizontal when said container is in said second position.

* * * * *

UNITED STATES PATENT AND TRADEMARK OFFICE

Certificate

Patent No. 4,736,600                                                       Patented: April 12, 1988

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is: Lester Brown, George Gropper and George Schmidt.

Signed and Sealed this Twenty-Second Day of August, 1989

JEFFERY V. NASE
*Supervisory Petitions Examiner*
*Office of the Deputy Assistant*
*Commissioner for Patents*